US009656884B2

(12) United States Patent
Brandon et al.

(10) Patent No.: US 9,656,884 B2
(45) Date of Patent: May 23, 2017

(54) BIPOLAR CELL FOR A REACTOR

(75) Inventors: John Robert Brandon, Berkshire (GB); Paul Cullen, Devon (GB)

(73) Assignee: Element Six Limited (GB)

( * ) Notice: Subject to any disclaimer, the term of this patent is extended or adjusted under 35 U.S.C. 154(b) by 327 days.

(21) Appl. No.: 13/878,208

(22) PCT Filed: Oct. 13, 2011

(86) PCT No.: PCT/GB2011/051984
§ 371 (c)(1),
(2), (4) Date: Nov. 14, 2013

(87) PCT Pub. No.: WO2012/049512
PCT Pub. Date: Apr. 19, 2012

(65) Prior Publication Data
US 2014/0054166 A1 Feb. 27, 2014

(30) Foreign Application Priority Data
Oct. 14, 2010 (GB) .................................. 1017346.6

(51) Int. Cl.
| C25C 7/02 | (2006.01) |
| C25C 7/00 | (2006.01) |
| C25C 3/08 | (2006.01) |
| C25C 3/10 | (2006.01) |
| C25B 9/02 | (2006.01) |
(Continued)

(52) U.S. Cl.
CPC ...... *C02F 1/46109* (2013.01); *C02F 1/46104* (2013.01); *C25B 9/063* (2013.01); *C25B 11/12* (2013.01); *C02F 2001/46128* (2013.01); *C02F 2001/46133* (2013.01); *C02F 2201/004* (2013.01); *C02F 2201/4611* (2013.01)

(58) Field of Classification Search
CPC .... C25C 7/02; C25C 7/00; C25C 3/08; C25C 3/10; C25B 9/02; C25B 9/00
USPC ............................................... 204/242, 286.1
See application file for complete search history.

(56) References Cited

U.S. PATENT DOCUMENTS 5,254,226 A * 10/1993 Williams ............ C02F 1/46104
204/229.6
5,399,247 A 3/1995 Carey et al.
(Continued)

FOREIGN PATENT DOCUMENTS

| AT | 505966 A1 | 5/2009 |
| DE | 10 2007 042171 A1 | 3/2009 |
(Continued)

OTHER PUBLICATIONS

International Search Report for PCT/GB2011/051984 dated Aug. 29, 2012.

*Primary Examiner* — Zulmariam Mendez
(74) *Attorney, Agent, or Firm* — Bryan Cave LLP

(57) ABSTRACT

A bipolar cell for a reactor for treatment of electrolyte such as waste water and effluent or for electrosynthesis comprises end electrodes and at least one bipolar electrode therebetween. The or each bipolar electrode comprises a diamond sheet. The cell includes a porous support structure, for example in the form of spacers, a lattice of plastic rods, or a woven mesh, between each end electrode and the adjacent diamond sheet, there being porous support structure between the or each pair of adjacent diamond sheets, the support structures acting to contact or support the or each diamond sheet.

13 Claims, 7 Drawing Sheets

(51) Int. Cl.
*C25B 11/03* (2006.01)
*C25B 9/00* (2006.01)
*C02F 1/461* (2006.01)
*C25B 9/06* (2006.01)
*C25B 11/12* (2006.01)

(56) References Cited

U.S. PATENT DOCUMENTS

| | | | |
|---|---|---|---|
| 6,306,270 B1* | 10/2001 | Hanni | C02F 1/46109 |
| | | | 204/268 |
| 6,315,886 B1 | 11/2001 | Zappi et al. | |
| 2005/0133364 A1* | 6/2005 | Leonida | C25B 13/02 |
| | | | 204/279 |
| 2006/0254907 A1* | 11/2006 | Taruya | C25B 1/12 |
| | | | 204/266 |
| 2009/0211918 A1 | 8/2009 | Hardee | |
| 2010/0032312 A1 | 2/2010 | Scarsbrook | |

FOREIGN PATENT DOCUMENTS

| | | |
|---|---|---|
| EP | 0659691 A1 | 6/1995 |
| JP | 2006/299392 A | 2/2006 |
| JP | 2006045657 | 2/2006 |
| JP | 2006-225694 A | 8/2006 |
| JP | 2007262531 | 10/2007 |
| JP | 2009242898 | 10/2009 |
| WO | 2008/029258 A2 | 3/2008 |

\* cited by examiner

BIPOLAR CELL FOR A REACTOR

The invention relates to the bipolar cell for a reactor.

Boron doped diamond (BDD) is useful in electrochemical generation of oxidizing species by virtue of its chemical inertness and wide potential window. In addition diamond is well known for its exceptional thermal conductivity and hardness. The use of solid and coated BDD electrodes in electrochemical systems has been described in, e.g. EP0659691 and U.S. Pat. No. 5,399,247. These patents describe the use of conductive diamond electrodes in electrochemical cells.

It is well known that the area of an electrochemical reaction surface determines the rate of production of oxidizing species (mol/s).

In WO 2008/029258 a bipolar cell is described having the virtue that the intermediate electrodes operate simultaneously as an anode and a cathode effectively doubling the working area of the electrode compared to one operating in a standard configuration.

BDD produced by chemical vapour deposition (CVD) typically grows at a relatively low rate measured in microns or a few tens of microns per hour. The process of manufacture requires considerable capital expenditure and consumption of electricity in proportion to the area being coated. Thicker layers are therefore proportionately more expensive to produce than thinner layers. More importantly, the cost per unit volume of diamond essentially converges on a lower limit regardless of scale of manufacture.

It is therefore a requirement of a cost-effective BDD electrode electrochemical cell to maximize the working surface area of the BDD relative to its volume.

A thin coating of BDD typically a few tens of microns thick on a metal electrode appears to satisfy this requirement. The metal electrode also provides a structure that is resistant to deflection and fracture. It can also be argued that the electrical resistance of a BDD coating on a highly conductive metal substrate will be lower than that of free-standing diamond layer of equivalent thickness. In spite of these advantages, however, the metal substrate is prone to attack by oxidizing species due to the presence of defects in the coating that disrupt the hermetic seal. Thicker coatings are not the solution for the following reasons 1. still no guarantee the defects will be eliminated particularly at corners/edges
2. increased stresses/mismatch stresses increase the likelihood of delamination or stress fracture of the coating
3. additional expenditure to produce a thicker layer (both sides)

Free-side BDD electrodes are therefore a more robust alternative to coated electrodes as they are not prone to failure by oxidation. One significant shortcoming of free-standing BDD electrodes is their relatively poor fracture resistance. Although good quality BDD can have a strength typically in excess of 300 MP it is a brittle material relatively sensitive to adverse mechanical loading.

In the bipolar cell described in WO 2008/029258 the centre electrodes are supported at the edge by a flexible material. As such, the electrode can be treated as being simply supported from the perspective of calculating stresses resulting from mechanical loads. The maximum tensile stress, $\sigma_{max}$, in a simply supported disk consisting of a homogeneous material and subjected to a uniform loading occurs in the centre of the disk and can be calculated from the following equation:

$$\sigma_{max} = 3wR^2(3+v)/8t^2 \qquad \text{Equation 1}$$

Where w is the load in Pa, R is the radius of the disk in m, v is Poisson's ratio and t is the thickness of the disk in m. This equation demonstrates that for a given loading the stress in the layer is proportional to the square of the unsupported span and inversely proportional to the square of the thickness. Roughly, this means that if the span of the electrode is doubled then the thickness of the electrode must also be doubled to maintain constant stress. The situation is complicated by other factors.

1. The fracture stress of diamond on the growth surface reduces as the thickness of the layer increases. This is due to the strength of the diamond being controlled by the characteristic flaw size; in this case the size of the grains. Since the grain size on the growth face increases roughly proportionately with the thickness, the failure stress falls correspondingly.
2. Fracture stress of diamond is distributed around a statistical mean. This distribution of fracture stress is described by the Weibull modulus term: a higher Weibull modulus defines a tighter distribution of fracture stress. However, the failure stress is area dependent and larger electrodes are statistically more likely to contain regions that will fracture at a lower stress.

The consequence of these two factors is that a larger diameter free-standing layer will require a disproportionate increase in thickness to maintain mechanical robustness thus incurring further costs.

Another critical factor in the design of an effective electrochemical cell is the optimization of the separation between electrodes. Reducing the electrode spacing can have benefits in improving the power efficiency of the cell. This is because a smaller spacing reduces the electrical resistivity of the electrolyte and the corresponding ohmic losses during cell operation. In WO 2008/029258 the cell is constructed in a series of plates or layers associated with each electrode. While this design has the virtue of being modular in construction there are practical limits placed on the separation of the electrodes as each plate must incorporate a feed channel for the electrolyte, a support structure for the electrode itself and some form of sealant. Optimally, the method of construction would allow the electrode separation to be reduced independently of factors such as the minimum practical plate thickness.

Finally, it is advantageous to be most cost effective the electrochemical cell should be simple in construction and able to be manufactured at low cost.

The problems can be summarized as:
1. Thinner BDD electrodes are prone to mechanical fracture
2. Thicker electrodes are too expensive to produce
3. The practical lower limit of electrode spacing is higher than optimum
4. Insufficient turbulence in the cell reduces mass transport rate at electrode surface.

According to one aspect of the invention there is provided a bipolar cell for a reactor for treatment of electrolyte including waste water and effluent, or for electrosynthesis the cell comprising end electrodes and at least one bipolar electrode therebetween, the or each bipolar electrode comprising a diamond sheet, the cell including a porous support structure between each end electrode and the adjacent diamond sheet and, where there is more than one diamond sheet, there being a porous support structure between the or each pair of adjacent diamond sheets, the support structures acting to contact and support the or each diamond sheet.

Thus, the porous support structure forms a sandwiched layer to support the or each diamond sheet, thereby reducing the risk of mechanical fracture and enabling the use of thinner diamond electrodes. The presence of the support structure between adjacent pairs of electrodes ensures that electrodes are spaced apart and thereby reduces the practical lower limit of electrode spacing. The porosity of the support structures increases turbulence in the cell which improves mass transport rate at the electrode surface.

Each support structure is preferably resilient. In this way, mechanical stresses can be absorbed. Each support structure may comprise a mesh or felt. In another embodiment, each support structure comprises a body perforated with through channels. In a further embodiment, each support structure comprises a lattice of rods. The lattice may be arranged so that the rods are at an acute angle to the direction of flow through the cell. This improves turbulence.

Each support structure may be made of any suitable material and, for example, may be made of corrosion resistant plastics material such as PP, PVDF or PTFE.

The support structures may have a random or systematic arrangement of pores. In one embodiment, the support structures have pores which decrease in size from the inlet to the outlet of the cell. In this way, progressive migration of coarse particulates to progressively finer particulates is allowed across the cell.

According to another aspect of the invention there is provided an electrode cell for a reactor for treatment of electrolyte including waste water and effluent or for electrosynthesis, the cell comprising a cell body and a cassette comprising a plurality of diamond electrode sheets mounted spaced from one another in a stack, the cassette being mounted in the cell body by resilient means, the resilient means being arranged to resiliently absorb movement perpendicular to the electrode sheets.

By forming the electrodes in a cassette which can be mounted in the cell body, manufacturing is simplified. Resilient mounting of the cassette allows for expansion and contraction of the cell due to the effects of thermal expansion or other sources of stress that occur during operation. This is particularly important where the diamond sheets being used are relatively thin.

The resilient means may comprise at least one spring. The or each spring may take any suitable form but in a preferred embodiment the resilient means comprises at least one helical spring. The or each spring may be any suitable length, but in a preferred embodiment the or each spring is such that the or each spring is arranged to move over less than 10% of its available movement, in normal use. In this way, the springs maintain consistent loading on the cassette. The or each spring may be such that the or each spring is arranged to move over less than 5% of its available movement in normal use. Preferably the resilient means comprises a plurality of springs.

The resilient means may be on just one side of the stack, but preferably is provided on both sides of the stack.

The electrode sheets may be mounted in any suitable way. The electrode sheets may be spaced apart by spacing means therebetween. The electrode sheets may be mounted together in the cassette by tie means. The tie means may take any suitable form and may comprise at least one rod through the stack of electrode sheets. The or each rod may carry the or each spacing means, and/or the or each spacing means may be carried sandwiched between and in contact with the sheets.

The cell body may be made of plastics material.

According to a further aspect of the invention there is provided a cell for a reactor for treatment of an electrolyte including waste water and effluent, or for electrosynthesis, the cell including a cassette comprising a plurality of diamond electrode sheets mounted spaced from one another in a stack, the cell further including a cell body and at least one end cap such that the cassette is received in the body and retained by attachment of the or each end cap, the or each end cap being connected to the body by at least one bolt, the or each bolt bolting into a tapped hole in a trunnion in the body.

A bolt could be screwed into a tapped hole in the plastic body, but the use of a trunnion provides much stronger threaded attachment, as well as spreading the load over the length of the trunnion.

Conveniently the body defines an inlet and an outlet for waste water and effluent to be treated and a manifold may be attached to the inlet and/or the outlet. The or each manifold may be connected to the cell by at least one bolt, the or each bolt bolting into a tapped hole in a trunnion in the body. Preferably, a common trunnion in the body receives both the or an end cap bolt and the or a bolt connecting a manifold. This reduces the number of parts required and simplifies construction.

Suitably there are two end caps which may be at opposed ends of the body.

The cassette is preferably mounted in the cell by resilient means, the resilient means being arranged to resiliently absorb movement perpendicular to the electrode sheets, the direction perpendicular to the electrode sheets preferably corresponding to the direction of insertion of the cassette into the body and also preferably corresponding to the direction of the axis of the or each bolt connecting the or each end cap to the body. The resilient means may comprise at least one spring which preferably acts in the said direction.

The ratio of electrode thickness to electrode spacing may be 1:500 or less, preferably 1:300, preferably 1:200, preferably 1:100, preferably 1:50, preferably 1:20, preferably 1:10, preferably 1:4 or less.

The reactor design makes high liquid throughput possible without damage to the fragile electrodes. The reactor may be arranged for throughflow of at least 0.5 $m^3$/hr, preferably at least 1 $m^3$/hr, preferably at least 3 $m^3$/hr, preferably at least 5 $m^3$/hr, preferably at least 10 $m^3$/hr, more preferably at least 20 $m^3$/hr, more preferably at least 30 $m^3$/hr, preferably at least 50 $m^3$/hr.

The cell preferably comprises a backing plate used to make electrical contact to the end diamond electrode. The backing plate is preferably a good electrical conductor, preferably a good thermal conductor and preferably corrosion resistant. The backing plates may be made of metal such as copper, titanium or niobium.

Embodiments of the invention will now be described by way of example and with reference to the accompanying drawings, in which.

EXAMPLE 1

Figure 4:
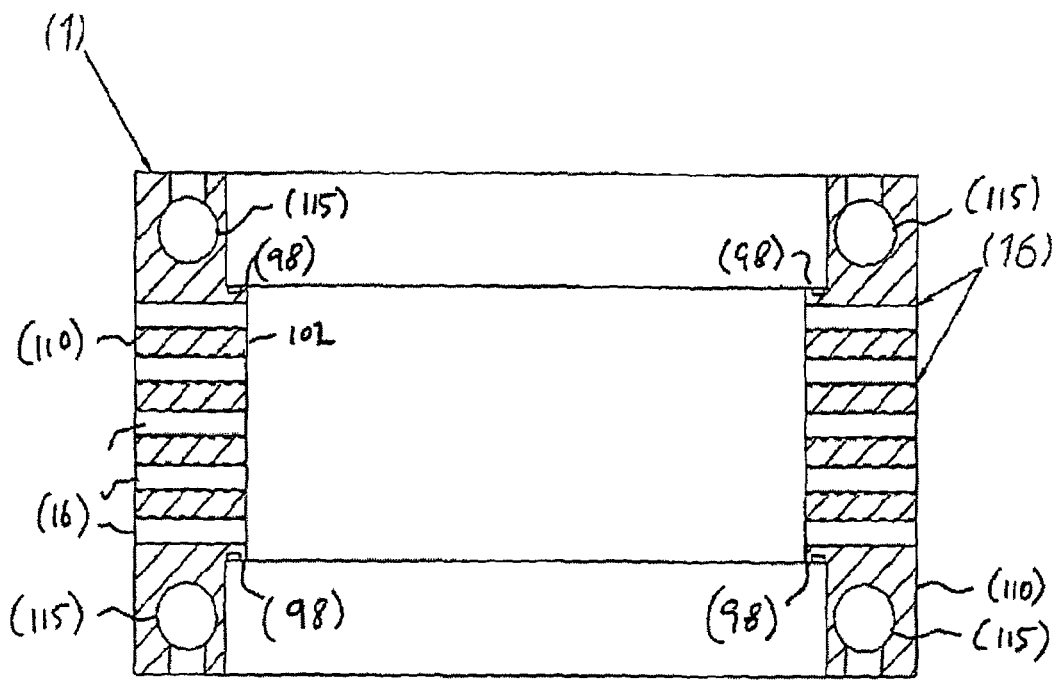
FIG. 4 is a side elevation in cross section of the main body of the cell of FIG. 1.

In FIG. 1 to FIG. 4, a structure for a bipolar electrochemical cell (100) is shown. In this design the cell body (1) is constructed in a single piece of corrosion resistant plastic such as PVDF or PTFE. The body (1) of the cell (100), shown in more detail in FIG. 4, is generally cylindrical and has a bore (102) running axially to accommodate an assembly of intermediate diamond electrodes (17) assembled in the form of a cassette (4), insert or stack. At each end of the cell (100) an O ring seal (10) is positioned on an annular shoulder (98) that makes a continuous seal with two bonded end electrode assemblies (5). Each of these bonded electrode assemblies (5) consists of a BDD electrode (106) attached to a suitable metal backing (108) using an electrically conductive adhesive, solder or braze. The metal backing plate (108) is chosen to be a good electrical conductor, to provide a stiff support to the solid BDD free-standing electrode (106) and to have some level of corrosion resistance suitable for the environment. Suitable materials include copper, niobium or titanium. The metal backing plates (108) are connected to an electrical source (not shown), in use. A matrix of side drillings (16) is cross drilled in the body (1) to allow the passage of liquid from inlet to outlet without incurring high flow resistance. A close packed array of holes (16) provides an optimal cross-sectional area for the liquid flow and ensures the supply of liquid is evenly distributed along the axis of the cell (100). Flats (110) are machined onto the surface of the main body (1) on opposing sides of the cell (100). Two manifolds (3) seal against these faces (110) using O ring seals (9).

The two end electrodes (106) are fastened to the cell (100) using a spring loaded clamping ring system. This comprises a two part cap (114). Each cap (114) comprises a clamp ring (116) which receives studs (14) in bores (113) to connect the cap (114) to the cell body (1), and a spring part (118) therewithin. The clamp ring (116) defines around its inner cylindrical surface (120) a downwardly facing shoulder (122) which engages an upwardly facing shoulder (124) defined on the outer cylindrical surface (126) of the sprung part (118). In this way, as the nuts (12) are tightened on to studs (14) to clamp the clamp ring (116) onto the cell body (1) the spring part (118) is also engaged axially. The sprung part (118) defines a plurality of pockets (128). Each pocket receives a helical spring (112). The axis of the springs (112), pockets (128) and studs (14) are all parallel to the axis of the bore (102) of the cell body (1). The end of each spring (112) bears against the backing plate (108) of an end electrode (106). The purpose of the springs (112) is to maintain consistent loading on the end electrodes (106) while the cell (100) expands and contracts due to the effects of thermal expansion or other sources of stress that occur during operation.

Figure 1:
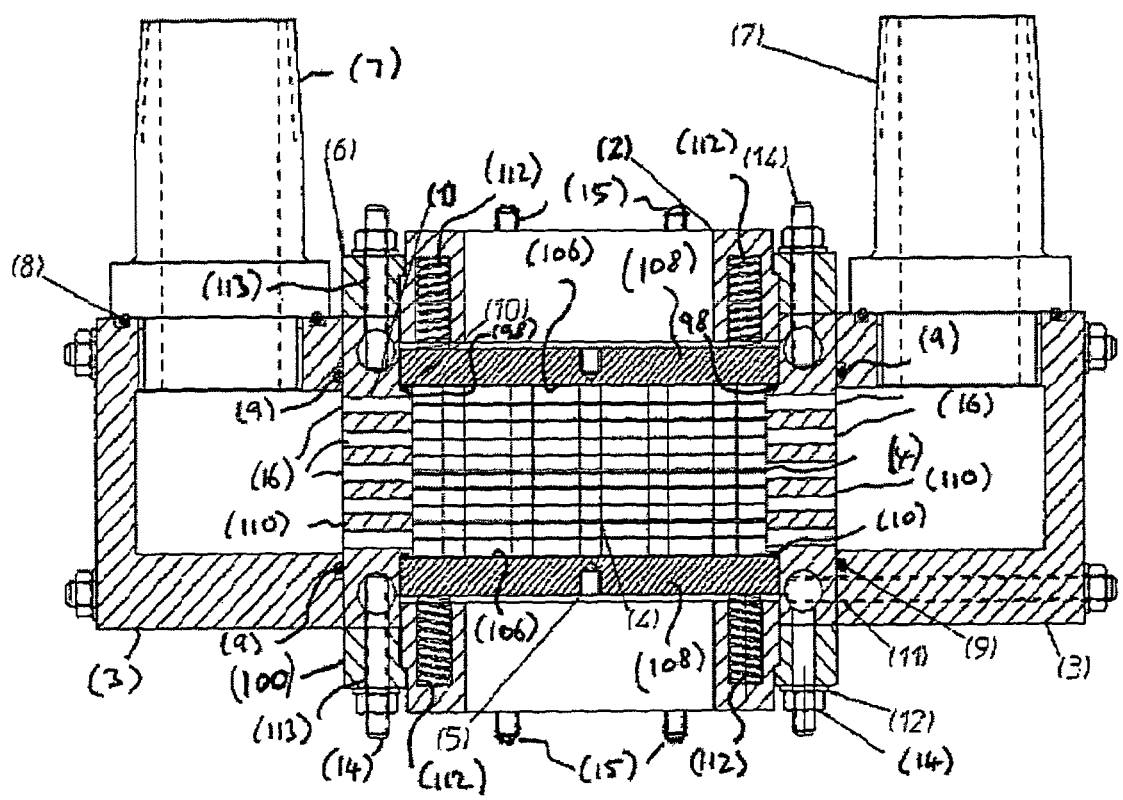
FIG. 1 is a side elevation in cross section of a bipolar cell in an embodiment of the invention referred to as Example 1.
Figure 2:
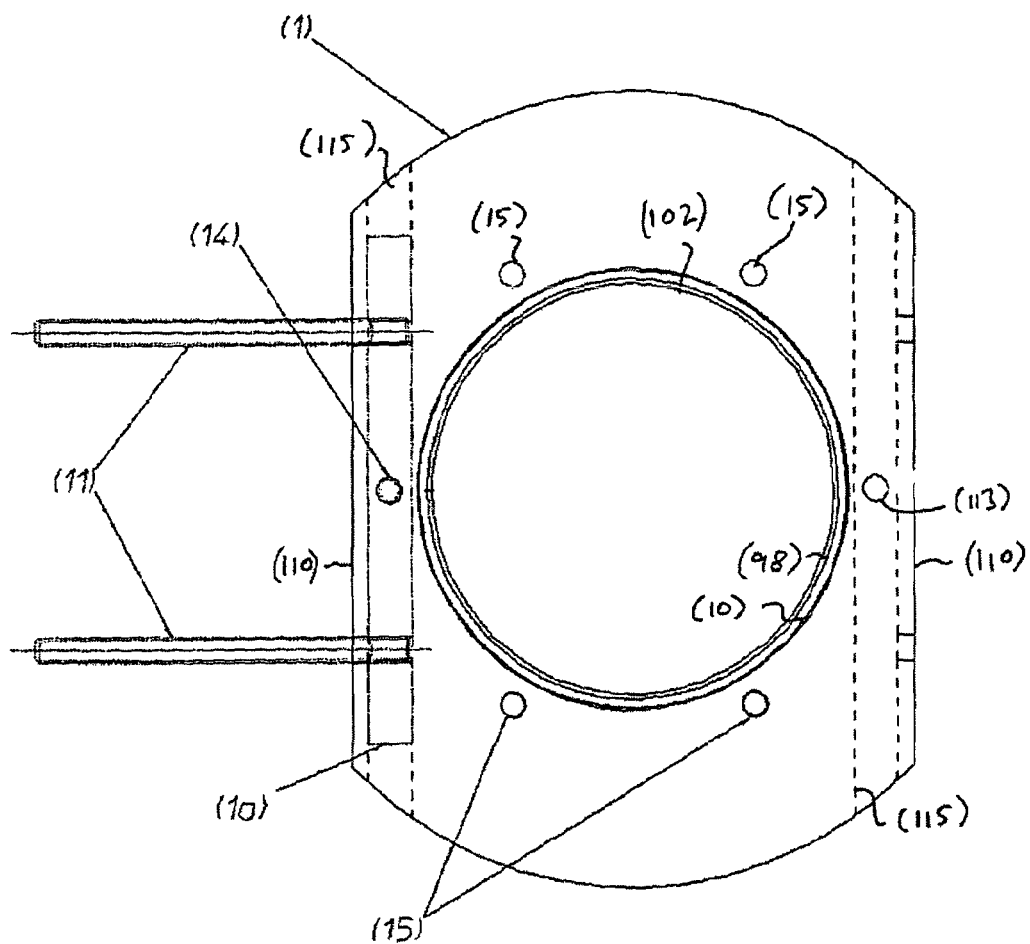
FIG. 2 is a plan view of the main body of the bipolar cell of FIG. 1 without the end cap.
Figure 3:
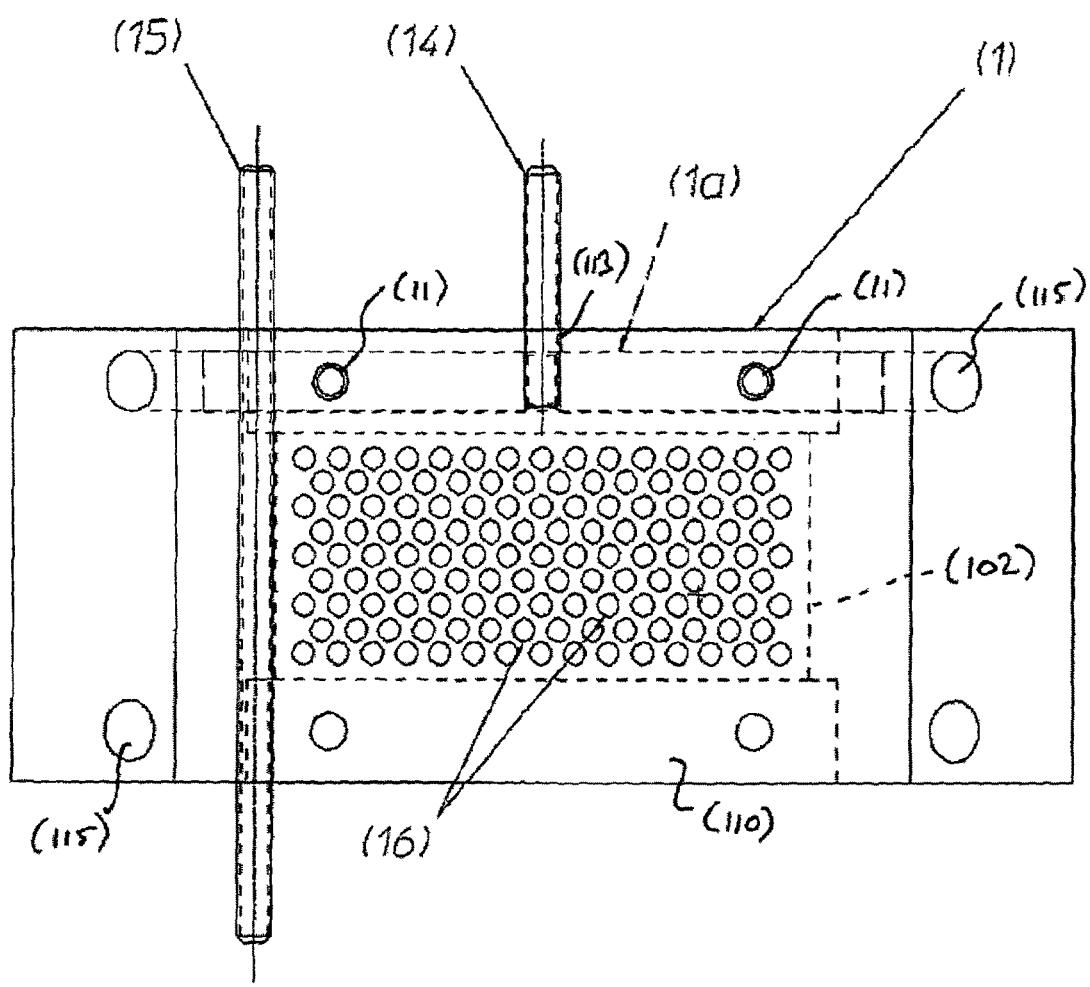
FIG. 3 is a side elevation of the cell of FIG. 1 with the manifold removed.

The two manifolds (3) are attached to the main body (1) of the cell (100) via studding (11) that is anchored to two pairs of trunnion bars (1a) positioned in bores (115) within the main body (1). As seen in FIGS. 1 and 2 the studs (11) are perpendicular to the studs (14) and attach to the same trunnion bars (1a). The benefits of the trunnion mount system is that it 1. eliminates the need for studding passing through the cell (100) that would put additional load onto the plastic body (1) and cause undesirable distortion of the central bore (102)
2. stiffens the face (98) on which the O ring seal (10) is made thus improving the uniformity of compression of the sealing O ring (10) in contact with the face (98)
3. provides a strong anchor point that could not easily be achieved by fixing the studs (11) directly in the soft plastic body (1) even with a thread insert. The fasteners to the clamp rings (116) are also partially anchored using studding (14) and via a tapped hole in the trunnion bar (1a).

The manifolds (3) are optionally fitted with adaptors (7) sealed by O rings (8) to facilitate connection to a liquid processing system.

Figure 5:
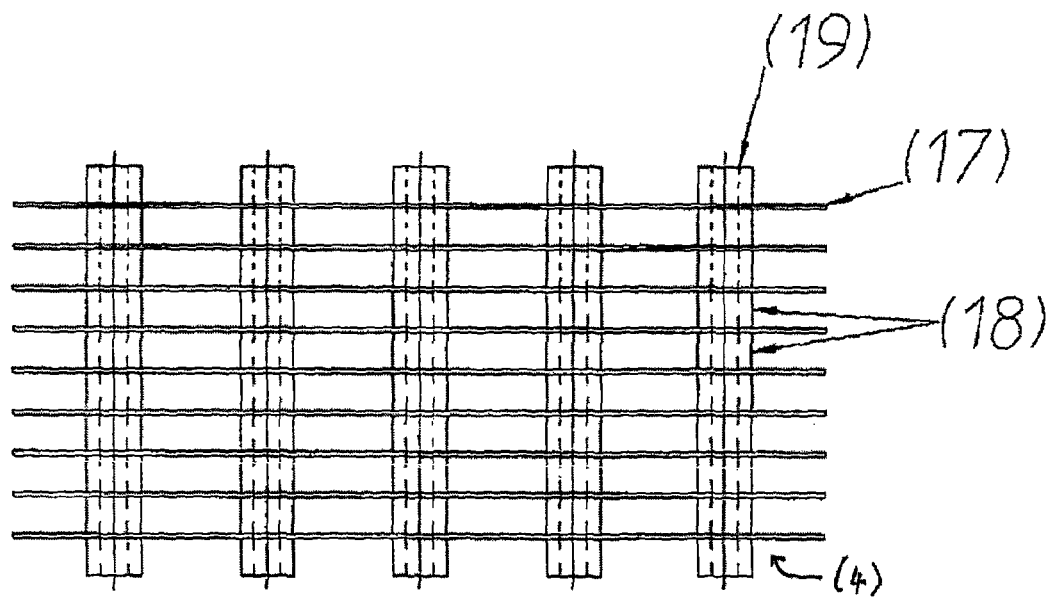
FIG. 5 is a side elevation of the cassette of the cell of FIG. 1.
Figure 6:
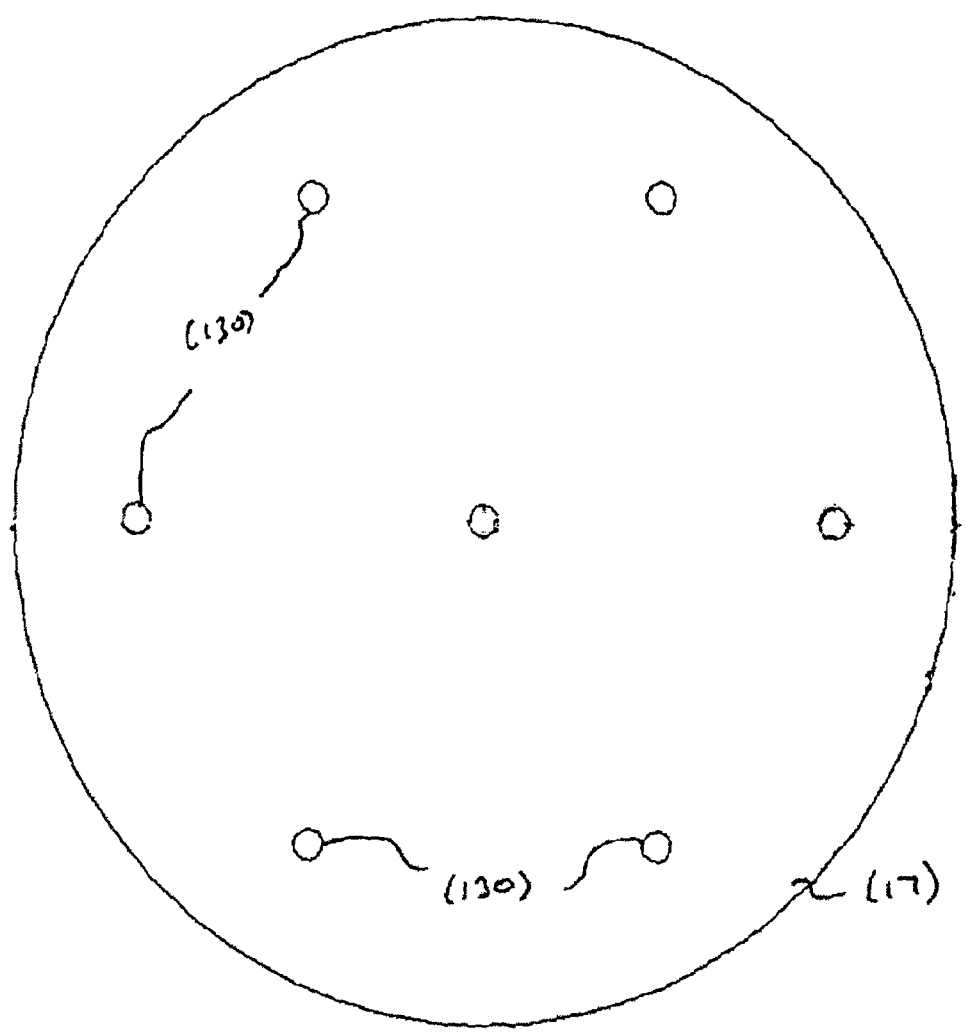
FIG. 6 is a plan view of an electrode disc of the cassette of the cell of the embodiment.

The internal structure of the bipolar BDD electrodes (17) is shown in FIG. 5. The BDD electrodes (17) are preassembled in the form of a stack or cassette (4) using a series of pins (19) and spacers. The circular BDD wafers (17) shown in FIG. 6 each have seven holes (130) cut, using a laser for example. Through the holes (130) a series of plastic, preferably PTFE, pins (19) are inserted. On each of the pins (19) are located a series of spacers (18) manufactured in a corrosion resistant material such as PTFE or an oxidation resistant ceramic such as alumina or silica. It is advantageous for the spacers (18) to be a close fit on the pins (19) such that the pins (19) and spacers (18) remain attached after assembly. The diameter of the pins (19) and spacers (18) is ideally as small as is practicable.

The advantages of this arrangement are as follows:

1. The pins (19) and spacers (18) provide mechanical support to the wafers (17) and enable a thinner wafer (17) to be used.
2. The electrode spacing is set by changing the thickness of the spacers (18)
3. The pins (19) can be extended to accommodate any number of wafers (17); for example any number in the range 3-20 or more
4. The number of spacers (18) across the disk (17) can be increased to provide more support for instance using a close packed array of pins (18) on an arbitrary pitch.

The optimum number of pins (19) is defined by giving consideration to such factors as; the thickness of the BDD electrode (17), the anticipated load, the size of the spacers (18). The only restriction to the number of pins (19) that can be accommodated is the physical space available.

The cassette (4) of electrodes (17) is conveniently demountable from the cell body (1) without dismantling of the overall cell structure. Thus, the cap (114) is removed by unscrewing nuts (12) on studs (14), then the bonded end electrode assembly (5) and the cassette (4) are lifted out of the bore (102) in the cell body (1).

The cell may be used in a reactor for treatment of waste water or effluent or may be used for electrosynthesis.

In the embodiment, each bipolar BDD electrode (17) has a diameter of about 138 mm and a thickness of about 0.5 mm. The electrodes (17) are spaced 5 mm apart. The electrode thickness to spacing ratio is thus 1:10.

The cell was used to treat waste water at a flow rate of water through the cell of 4 $m^3$/hr.

EXAMPLE 2

Figure 7:
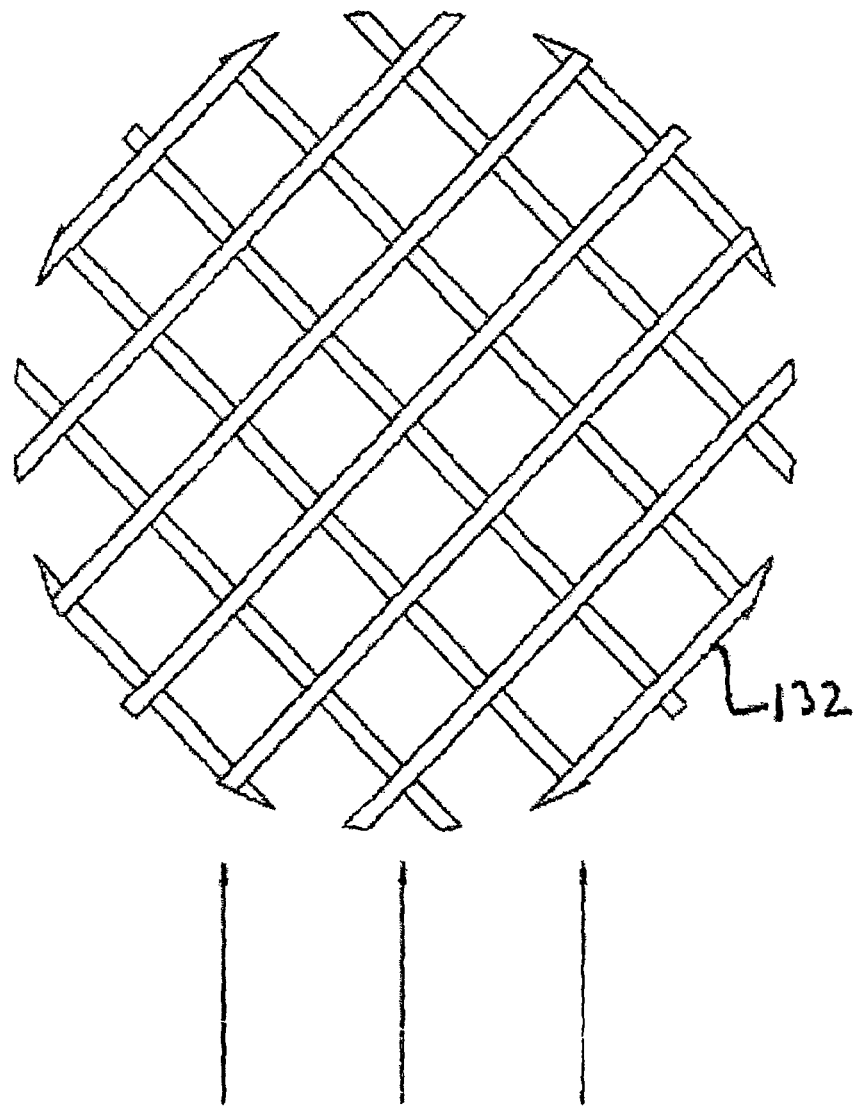
FIG. 7 is a fragmentary plan view of a support structure between adjacent electrodes of the cell in Example 2; and, FIG. 8 is a fragmentary elevation of a cassette in Example 3.

In another example, the spacers (18) are omitted and the electrodes (17) are supported on a three dimensional structure (FIG. 7) consisting of a series of plastic rods (132) arranged orthogonally in a regular lattice. The diameter of the rods (132) determines the spacing of the cell electrodes (17). The rods (132) themselves are joined at the interstices either by casting the structure, thermally in the case of thermoplastic or pinned in the case of materials that are not convenient to bond using other established methods. Arranged in this way the rods have the additional benefit of acting as a turbulence enhancer by increasing the relative velocity of the flow of liquid near the electrode surface and thus helping to promote mass transfer. The rods (132) may be made of PTFE or PVDF. The rods (132) constitute an embodiment of the aforesaid "porous support structure". The rods (132) are in contact with and provide mechanical support to the electrodes (17). Because of the space in the cell there can be a high throughflow, of as much as 50 $m^3$/hr of fluid to be treated. The support provided by the construction of the invention means that high throughflows can be used without fracture or other damage to the diamond electrodes.

EXAMPLE 3

Figure 8:
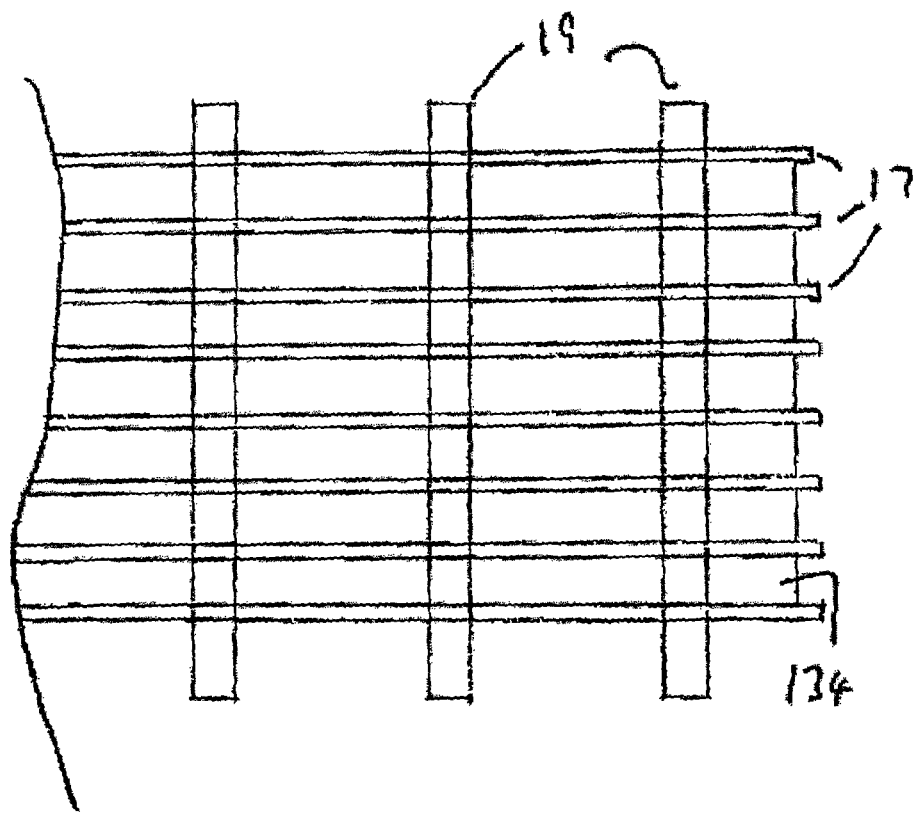

In this example shown in FIG. 8, the rods (132) are omitted and the electrode support structure comprises a woven mesh (134) or randomly oriented fibres manufactured from a corrosion resistant material such as PVDF or PTFE. This structure has the advantage of providing a compliant support across the majority of the electrodes' (17) area while allowing circulation of liquid. In this way the thickness of the disk (17) can be further reduced in an effort to reduce volume of BDD while achieving sufficient surface area. It is particularly well suited to applications in which liquid electrolyte contains particulate matter. In this example the mesh acts as a filter that entraps the particles long enough for them to be broken down by the chemical action of the cell.

The density of the mesh can be varied across the cell to allow progressive migration of coarse particulates to progressively finer particulates across the cell.

It will be apparent that in all the examples above the diamond disk will still function as an electrode (17) provided the disk remains substantially intact i.e. cracks may exist but the disk is substantially in one piece—provided the disk is supported at sufficient points to overcome deflection of the electrode in the vicinity of the fracture. The spacing in this embodiment is 2 mm. The thickness to spacing ratio is thus 1:4. The cell can be used for electrosynthesis.

EXAMPLE 4

In this example the support structure comprises a hollow section corrosion resistant material in which a series of channels are arranged longitudinally with the direction of liquid flow. Such structures are available in a range of engineering plastic materials including polypropylene. A series of perforations in the surface of the film facilitate contact of the electrolyte with the electrode surface. The holes may be arranged in a close packed array to achieve a large effective contact area with the electrodes.

It is evident that other combinations of Example 2, 3 and 4 are possible: for example the pin and spacer support method of example 2 may be combined with the mesh of example 3 or the turbulence enhancer of Example 3 to achieve plate spacing independent of the compliance of the mesh and independent of the dimensions of the turbulence enhancer.

The invention claimed is:

1. A bipolar cell for a reactor, the cell comprising end electrodes and at least one bipolar electrode therebetween, the or each bipolar electrode comprising a diamond sheet, the cell including a porous support structure between each end electrode and the adjacent diamond sheet and, where there is more than one diamond sheet, there being a porous support structure between the or each pair of adjacent diamond sheets, the support structures acting to contact and support the or each diamond sheet; the cell further comprising a cell body having a cylindrical bore to accommodate the at least one bipolar electrode, an array of holes forming an inlet to the cell body through which untreated effluent enters the cell and an array of holes forming an outlet from the cell body through which treated effluent exits the cell, the holes of inlet and outlet arrays of holes being substantially uniformly distributed across the full height of the cylindrical bore in the cell body in a direction perpendicular to the plane of the at least one bipolar electrode, the inlet and outlet being arranged such that effluent flow from the inlet to the outlet is evenly distributed and substantially parallel to the plane of the at least one bipolar electrode; wherein the porous support structure supports the or each diamond sheet at sufficient points to reduce the risk of a fracture in use; and wherein the porous support structure is configured to increase turbulence in the cell.

2. A bipolar cell as claimed in claim 1, wherein each support structure is resilient.

3. A bipolar cell as claimed in claim 2, wherein each support structure comprises a mesh or felt.

4. A bipolar cell as claimed in claim 1, wherein each support structure comprises a body perforated with through channels.

5. A bipolar cell as claimed in claim 1, wherein each support structure comprises a lattice of rods.

6. A bipolar cell as claimed in claim 5, wherein the lattice is arranged so that the rods are at an acute angle to the direction of flow through the cell.

7. A bipolar cell as claimed in claim 1, wherein the support structures have pores which decrease in size from the inlet to the outlet of the cell.

8. A bipolar cell for a reactor as claimed in claim 1, the cell further comprising a cassette comprising a plurality of diamond electrode sheets mounted spaced from one another in a stack, the cassette being mounted in the cell body by resilient means, the resilient means being arranged to resiliently absorb movement perpendicular to the electrode sheets.

9. An electrode cell as claimed in claim 8, wherein the resilient means comprises at least one spring.

10. An electrode cell as claimed in claim 8, wherein the electrode sheets are mounted together in the cassette by tie means.

11. An electrode cell as claimed in claim 10, wherein the tie means comprises at least one rod through the stack of electrode sheets.

12. An electrode cell as claimed in claim 11, wherein, where the electrode sheets are spaced apart by spacing means therebetween, the or each rod carries the or each spacing means.

13. A cell as claimed in claim 1, wherein the cell comprises a backing plate to make electrical contact with each end diamond electrode.

* * * * *